April 2, 1929.  S. F. ARBUCKLE  1,707,593
APPARATUS FOR INDICATING THE DEVIATION FROM HORIZONTAL
OF BEAMS OF LIGHT PROJECTED BY REFLECTORS
Filed April 18, 1922
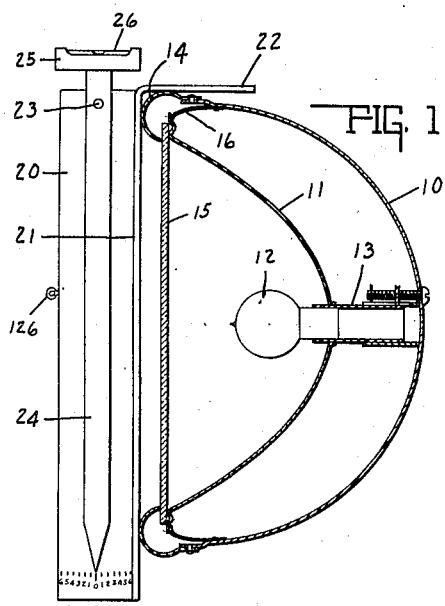
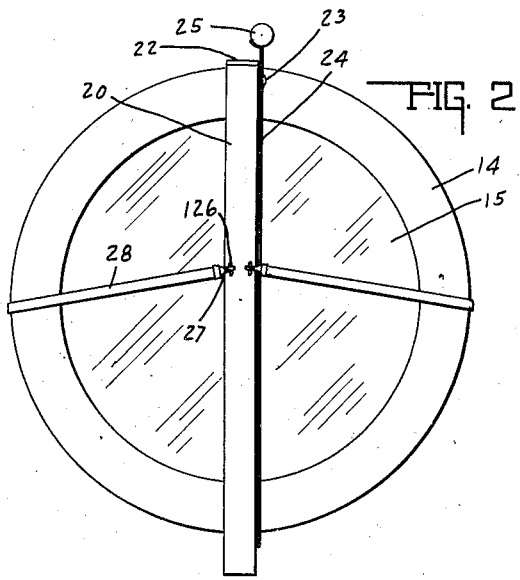
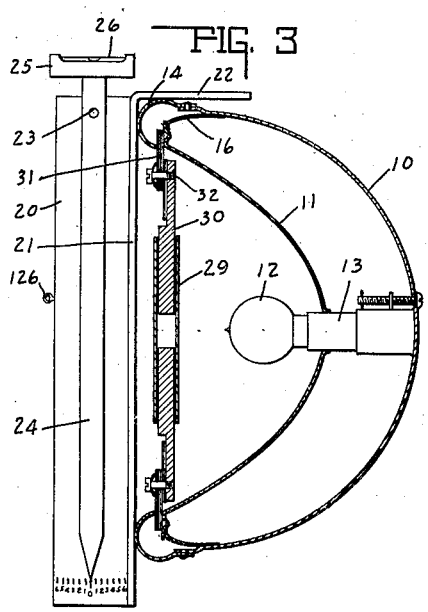
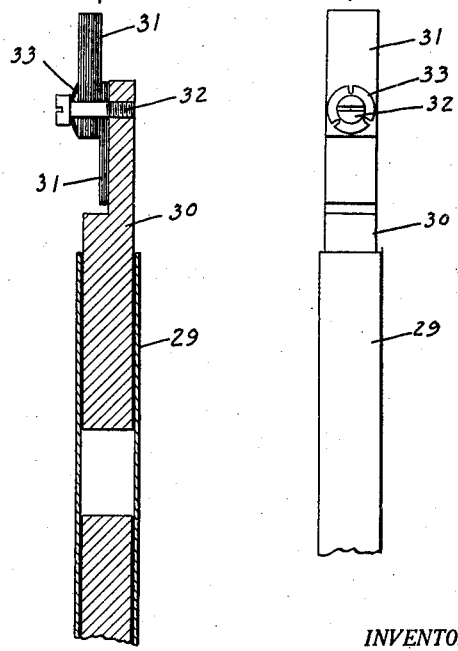
INVENTOR.
SAMUEL F. ARBUCKLE.
BY
ATTORNEYS.

Patented Apr. 2, 1929.

1,707,593

UNITED STATES PATENT OFFICE.

SAMUEL F. ARBUCKLE, OF DETROIT, MICHIGAN, ASSIGNOR TO MONOGRAM LENS CORPORATION, A CORPORATION OF DELAWARE.

APPARATUS FOR INDICATING THE DEVIATION FROM HORIZONTAL OF BEAMS OF LIGHT PROJECTED BY REFLECTORS.

Application filed April 18, 1922. Serial No. 555,277.

This invention relates properly to mechanism for adjusting light beams emanating from a reflecting surface or projector to a predetermined angular relationship with horizontal. More specifically, the invention relates to a device for use in adjusting a head lamp of an automobile or the like for indicating the tilting or deviation of the axis or centers of the projected beam thereof from horizontal.

In various uses, it is advantageous that light reflecting apparatus be adjusted so that the light beams reflected are parallel to horizontal or at some given angle with reference to horizontal. Particularly, has it been desirable in connection with automobiles or automotive vehicles to adjust the headlamp so as to secure proper illumination and to prevent glare, and laws have been passed, regulating and enforcing such means.

In order to conform to the various State laws regarding vehicle lights, the projected rays therefrom must be established by certain focal adjustments, and directed at a certain inclination or angle to a horizontal plane. For illustration, in some States, it is provided that the center of the projected beam must pass through a point one foot below a horizontal plane at a distance of one hundred feet, or its equivalent, three inches at twenty-five feet. Heretofore in order to adjust a head lamp on a vehicle to conform to the law in this respect, it has been necessary to position the vehicle in a dark room on a horizontal plane twenty-five or one hundred feet, as the case may be, from a screen, and in this manner determine the deviation from the horizontal plane of the beam of light projected from the head lamp.

This invention has for its object to provide a small and compact instrument which may be readily applied to a head lamp regardless of the place or position thereof, which will immediately indicate the deviation of the beam at a given distance. Such an instrument enables one to readily determine the deviation of the beam from horizontal so that an adjustment may be made thereof, which instrument will be hereinafter shown and described.

The full nature of the invention will be understood from the accompanying drawings and the following description and claims.

In the drawings, Fig. 1 is a side elevation of a lamp casing with the adjusting instrument in position; Fig. 2 is a front elevation of the same; Fig. 3 shows the upper portion of Fig. 1 with the lens removed and a compensator mounted in place thereof; Fig. 4 is an enlarged side elevation of a portion of the compensator; and Fig. 5 is an enlarged front elevation of a portion of the compensator.

In the drawings there is shown a head lamp for a vehicle having a casing 10, a reflector 11 and a lamp 12. Said lamp is mounted in an adjusting sleeve 13 which extends through the rear of said reflector and is adjustably mounted upon the casing in any suitable manner. Mounted upon the front of the casing, there is a door rim 14 provided with a lens or closure 15, said lens being positioned between the door rim and the reflector in the usual manner. For maintaining the reflector in position within said casing and exerting a pressure against said reflector, lens and door rim, there is a spring member 16. The above described head lamp may be of the usual construction or may be of any of the well known types now in use.

The instrument for indicating the tilt or deviation of the projected beam from a horizontal plane comprises an aligning and supporting member 20 of a length slightly greater than the diameter of the lamp casing and door, or, as shown herein, approximately twelve inches in length. Said instrument is adapted to be placed against the face of the lamp diametrically thereof. The face of the member adjacent said lamp is provided with an edging or aligning member 21 which extends longitudinally thereof and thence at right angles to provide a mounting 22. In order to accurately determine the position of the beam of light, which, theoretically, projects from the reflector along the central axis thereof, the supporting member 20 should be at right angles thereto, or parallel with the plane through the front edge of the reflector, assuming said reflector to be properly formed and the lamp properly focused therein. Inasmuch as the lens 15 is of the same thickness about its periphery and spaces the door that distance from the forward edge of the reflector, and since the door rim extends an equidistance from said lens, it is suitable for the purpose to position said member against the opposite sides of the door. In this position said member will be substantially parallel to the plane through the front surface of the reflector, and, therefore, extend at right angles to the axis of the reflector and beam of light.

Pivotally mounted near the top of said supporting member at 23, there is an indicating pointer or arm 24 which extends longitudinally of said member toward the lower end thereof. Mounted upon said pointer in a plane at right angles thereto, there is a level 25 having the usual level indicating tube 26 mounted in the top thereof, for enabling said pointer to be positioned in a vertical plane. From the center of the pivot point 23 to the pointed lower end of said pointer, the distance is ten inches, and the point thereof is adapted to register with calibrations, as indicated in Fig. 1, wherein zero is in the center and the numerals 1 to 6 progress from each side thereof, with their indicating marks spaced one-tenth of an inch apart. It will be readily understood that upon said point diverting one-tenth of an inch, or one graduation from the center when the level is set, the inclination of the supporting member 20, and, therefore, the lamp which it abuts would be such that the axis extending perpendicular thereto will deviate one foot from a parallel plane at a distance of one hundred feet. Therefore, in actual operation, when the instrument is properly positioned with respect to the lamp or reflector, the point of the pointer 24 will indicate numerically the number of feet of deviation of the beam of the light from parallel at one hundred feet. Hence, by means of this instrument its mere application to the front of a lamp will readily indicate, without calculation, the deviation of the axis of the beam of light projected therefrom from horizontal at a distance of one hundred feet, whereby said lamp may be adjusted with respect to the legal requirements.

For maintaining said instrument in position while the reading is being made, there is provided in the member 20 a hole 126 in which the hooked ends 27 of an elastic cord 28 may be hooked and placed about the body of the lamp casing. Should it be desirable or necessary to remove the lens from the lamp, a compensating device may be employed to compensate for the thickness of the removed lens, inasmuch as the reflector 11 would otherwise move forward out of its relative position with respect to the lamp 12. The compensating device comprises a square tube 29 extending about one-half the diameter of the average headlight casing, in which are slidably mounted at each end of said tube the square rods 30, whereby said rods may be slidably moved longitudinally thereof to the proper diameter of the headlight. The outer ends of said rods are cut away to provide a recess into which the disks 31 may be swung, said disks being pivotally mounted on the extreme ends of said rods by the screws 32 and yieldingly held in place thereon by the spring friction washer 33. This arrangement is such that upon removal of the lens 15, the thickness of said lens at that portion positioned between the reflector and lamp door may be gaged and a number of disks 31 selected to represent that thickness. Said disks are positioned as shown in Fig. 3; while the remaining disks are then swung into the cut away portion of the rod out of the way. After this has been done, the rods are adjusted in the tube 29, so that the outwardly extending disks may be positioned between the reflector and lamp door for spacing them apart a distance equidistant to the spacing by the lens. This will then compensate for the removal of the lens so that the reading of the instrument may be accurately made.

The invention claimed is:

1. In a testing device for a head lamp comprising a casing having a reflector therein, and a lighting element, a member adapted to be positioned adjacent the face of said head lamp, and means on said member for indicating the deviation from horizontal of a beam of light projected from the lighting element within said reflector.

2. A device for indicating the deviation from horizontal of a beam of light from a lamp having a reflector and lighting element, including a supporting member adapted to be positioned across and adjacent to the face of said lamp, yielding means for securing said member upon said lamp, said member having a plurality of graduation marks thereon, an indicating pointer pivotally mounted at one end adjacent one end of said member so as to freely swing thereon, and a leveling device mounted on said pointer.

3. A level determining mechanism for light reflecting apparatus which comprises a base plate, means secured to one end of said plate for supporting the base plate on the light reflecting apparatus, a support plate secured to said base plate, a pointer pivotally suspended from the support plate, there being indicia on said support plate adjacent one end of the pointer, and a level on the other end of the pointer.

4. A level determining mechanism for light reflecting apparatus which comprises a base plate, means secured to one end of said plate for supporting the base plate on the light reflecting apparatus, a support plate secured to said base plate, a pointer pivotally suspended from said support plate, there being indicia on said support plate adjacent one end of the pointer, and a level on the other end of the pointer, the plane of the support plate being approximately parallel to the light rays emanating from said light reflecting apparatus when said mechanism is placed in operative position.

5. A level determining mechanism for light reflecting apparatus which comprises a base plate, means secured to one end of said plate for supporting the base plate on the light reflecting apparatus, a support plate secured to said base plate, and a pointer pivotally suspended from the support plate.

6. In a beam deviation indicating device for a headlamp comprising a casing, a reflector, and a light source within said reflector; a member adapted to be positioned in fixed relation to said reflector; and means on said member for indicating the deviation from the horizontal of the axis of the reflector.

In witness whereof, I have hereunto affixed my signature.

SAMUEL F. ARBUCKLE.